Jan. 30, 1934.  S. V. POULTNEY  1,945,443
MACHINE FOR ROLLING AND CUTTING DOUGH OR THE LIKE PLASTIC SUBSTANCES
Filed Sept. 1, 1932  2 Sheets-Sheet 1

INVENTOR:
SAMUEL VICTOR POULTNEY
BY Wilkinson & Mawhinney
ATTORNEYS

Jan. 30, 1934.  S. V. POULTNEY  1,945,443
MACHINE FOR ROLLING AND CUTTING DOUGH OR THE LIKE PLASTIC SUBSTANCES
Filed Sept. 1, 1932  2 Sheets-Sheet 2
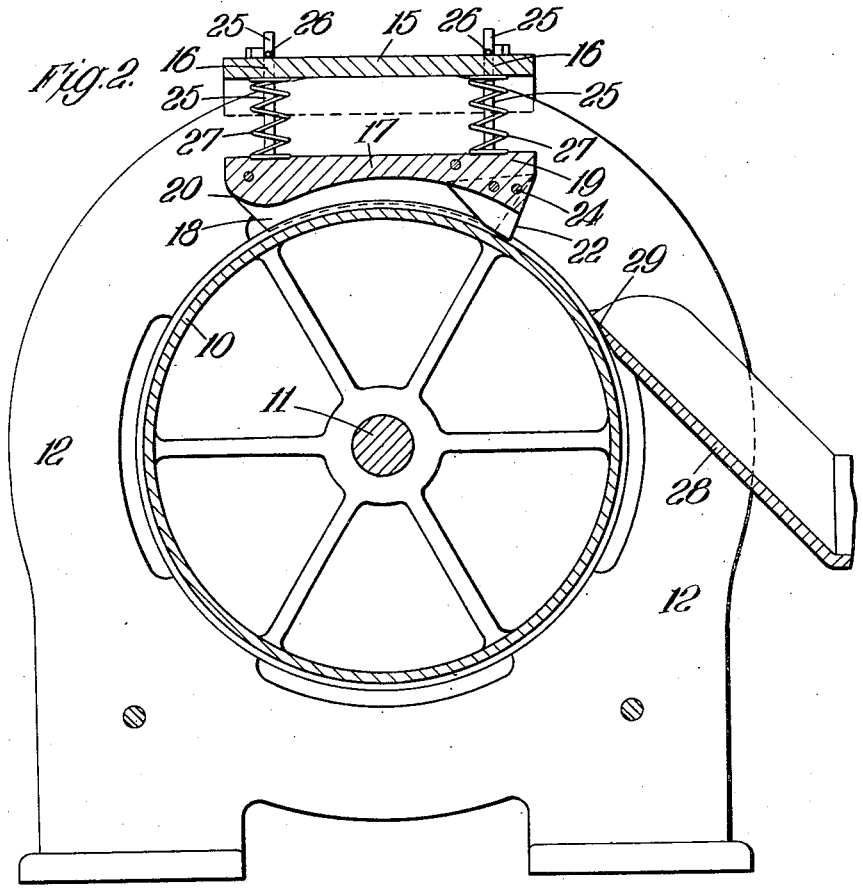
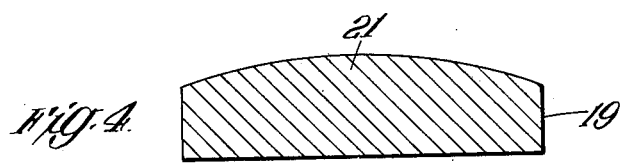
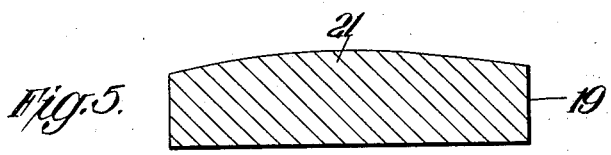
INVENTOR:
SAMUEL VICTOR POULTNEY
BY Wilkinson Marshum
ATTORNEYS Patented Jan. 30, 1934

1,945,443

UNITED STATES PATENT OFFICE 1,945,443

MACHINE FOR ROLLING AND CUTTING DOUGH OR THE LIKE PLASTIC SUBSTANCES

Samuel Victor Poultney, Harrow Weald, England, assignor to Energen Foods Company Limited, Willesden, England Application September 1, 1932, Serial No. 631,425, and in Great Britain September 14, 1931

9 Claims. (Cl. 107—9)

The present invention relates to machines for rolling and cutting dough or the like plastic substances and more particularly dough-like substances having a glutinous consistency.

An object of the present invention is the provision of a rolling and cutting machine in which lumps or balls of dough may be subdivided into equal fractions with a high degree of accuracy, in a rapid and economical manner.

The present invention relates to machines of the type incorporating a combined moulding and cutting element cooperating with a revoluble drum. Machines of this type in which the moulding element surrounds the whole circumference of the drum and is not displaceable with respect thereto are known and it is also known to provide the moulding element with a dividing knife more particularly for forming the two halves of a cottage loaf.

According to the present invention in a machine for moulding lumps of dough or the like substance nto cylindrical shape and cutting said cylinders into slices, one or more stationary moulding members are displaceably and resiliently mounted for cooperation with a revoluble drum, said moulding members being short in proportion to the drum circumference and provided with side walls enclosing the moulding space and with a plurality of slicing knives, and the drum being provided with a number of circumferential grooves adapted to receive the feet of the side walls and the tips of the knives of the moulding member for aligning the latter and ensuring complete slicing of the dough.

According to a feature of the invention the moulding element is given a transverse convexity facing towards the drum in the region where the dough is fed in between the drum and the stationary member. This convexity is for the purpose of effectively spreading the dough laterally, since a dough or the like substance a glutinous nature possesses considerable natural resilience or elasticity on account of which a uniform cylinder of such dough cannot be formed if the clearance between the drum and the moulding element is everywhere constant in an axial direction.

The stationary members may conveniently be slidably mounted in a rigid frame for radial movement, and strongly spring-pressed towards the drum, stop means being provided to prevent the side plates from bearing on the bases of the grooves in the drum surface, a small working clearance being left at the base of the grooves. It is also preferable to arrange the cutting edges of the blades at an acute angle with the drum surface.

In order that the nature of this invention and the manner of carrying it out may be more fully ascertained, a constructional embodiment thereof is described with reference to the accompanying drawings, of which:—

Fig. 2 is a central vertical section taken along the line 2—2 in Fig. 1.

Figure 1:
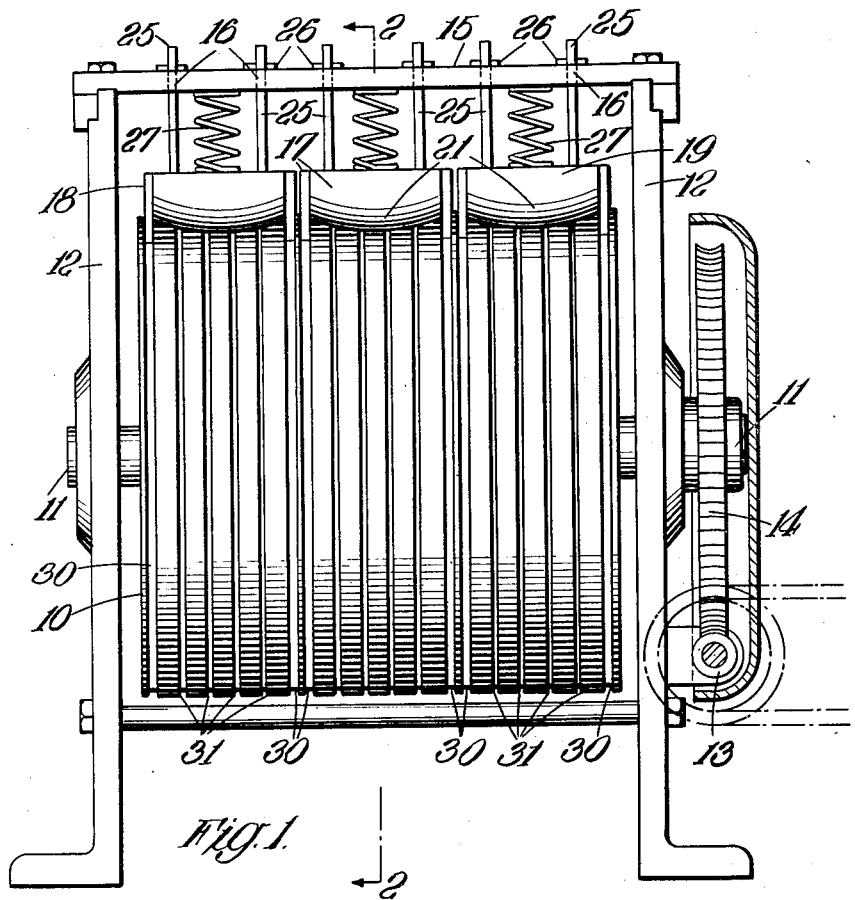
Fig. 1 is an end elevation of the apparatus partly in section.
Figure 3:
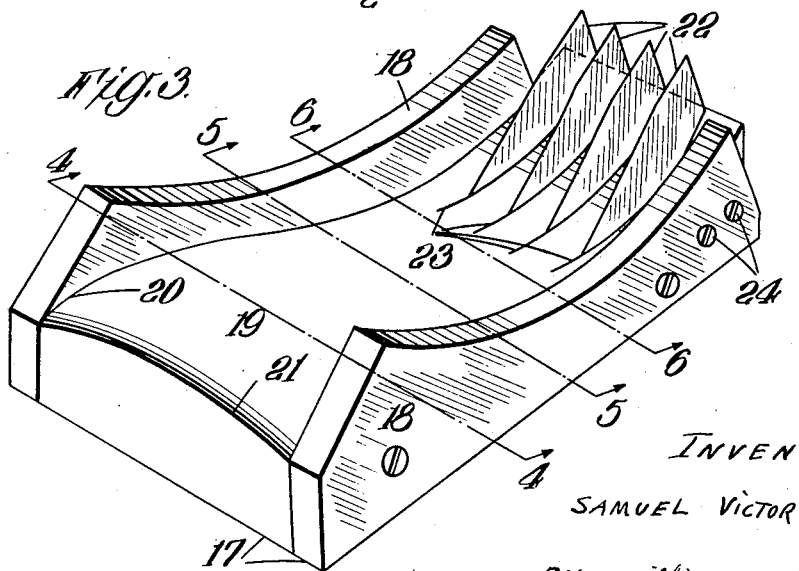
Fig. 3 is a perspective view of a moulding and cutting member shown in reversed position.

Figs. 4, 5 and 6 are cross sectional views of the moulding block taken along the lines 4—4, 5—5 and 6—6 in Fig. 3 respectively.

Referring to the drawings, a revoluble drum 10 is mounted on an axle 11 journalled in cheek plates 12 and driven by a worm 13 and worm wheel 14. The cheek plates 12 are spanned at tht top by a bridge plate 15 through which are drilled a number of vertical holes 16. Three stationary moulding and cutting members 17 are provided, each composed of two side plates 18, whose feet are made concave and arranged to fit in grooves 30 in the surface of the drum 10, and a moulding block 19 whose lower surface is arranged to have a substantially constant clearance from the drum in the circumferential direction except at the end where the material is fed in, which end is rounded off at 20 to give a bell mouthed entry for the material, while the part of the block near the entry end is given a slight transverse convexity 21 for the purpose hereinbefore mentioned. At the exit end each block carries four blades 22 of substantially triangular shape which are secured in saw cuts 23 by studs 24. The tips of blades 22 enter small grooves 31 formed in the surface of the drum 10. The blades are equally spaced so that the material passing through each stationary member is divided into five equal parts after being formed into a cylinder.

In the upper surface of each block 19 are secured four upright parallel pins 25 two at each ends which pass through and are guided by the vertical holes 16 in the bridge plate 15, cotters 26 being provided to limit the movement of the block 19 towards the drum 10, while the contrary movement is resisted by powerful helical springs 27 inserted between the block and the underside of the bridge plate, two springs being provided to each moulding and cutting member 17, one at each end.

The machine may be made of any suitable materials, aluminium being a convenient material for the drum and cast iron or steel for the moulding blocks, bridge plates and cheek plates, the cutting blades and side plates of the moulding and cutting members being conveniently of steel.

A discharge chute shown at 28 in the drawings may also be provided having a scraper 29 which bears against the drum surface close to the point of discharge of the cut slices of dough from the blades.

What I claim is:—

1. In a dough rolling and cutting machine a revoluble drum having in its surface a number of circumferential grooves, at least one stationary moulding member arranged to coact with a short arc of the circumference of said drum, means for yieldably maintaining said moulding member in spaced relation with said drum so as to provide a moulding space between said member and said drum, a pair of side walls fixed to said moulding member for laterally enclosing the moulding space and having their free edges shaped and adapted to enter certain of said circumferential grooves of the drum surface for the purpose of aligning the moulding member and a plurality of slicing blades mounted on said moulding member, the extremities of said blades being arranged to enter into others of the circumferential grooves of the drum surface, so that said blades completely traverse the delivery end of said moulding space.

2. In a dough rolling and cutting machine, a revoluble drum having in its surface a number of circumferential grooves, at least one stationary moulding member arranged to coact with a short arc of the circumference of said drum, means for yieldably maintaining said moulding member in spaced relation with said drum so as to provide a moulding space between said member and said drum, a pair of side walls fixed to said moulding member for laterally enclosing the moulding space and having their free edges shaped and adapted to enter certain of said circumferential grooves of the drum surface for the purpose of aligning the moulding member and a plurality of slicing blades mounted on said moulding member the extremities of said blades being arranged to enter into others of the circumferential grooves of the drum surface, so that said blades completely traverse the delivery end of said moulding space, the cutting edge of said blades being substantially straight and meeting the drum surface at an acute angle.

3. A dough rolling and cutting machine including a pair of side frames, a revoluble drum journalled therein and having in its surface a plurality of circumferential grooves of which some are relatively wide and others relatively narrow, a fixed bridge member spanning the space between the side frames above the drum, a plurality of moulding members slidably mounted on said bridge member for movement substantially radial of the drum, each of said moulding members having a moulding surface extending over a small arc of the drum circumference and arranged substantially parallel with the drum surface but including a transverse convexity in the region of the feed end of such moulding surface, a pair of side walls fixed to each moulding member and enclosing a moulding space, each of said side walls having its free edge curved correspondingly to the drum surface and arranged to enter one of the relatively wide grooves in the drum surface, a plurality of slicing blades fixed in each of said moulding members towards the delivery end thereof, spaced at equal distances axially of the drum and having their cutting edges meeting the drum surface at an acute angle, their extremities being received into the relatively narrow grooves of the drum surface, spring means arranged to press said moulding members towards the drum and restraining means limiting the movement of the moulding members towards the drum.

4. In a dough rolling and cutting machine, a revoluble drum, circumferential grooves in the surface of said drum, a moulding member and means yieldably supporting said moulding member in spaced relation with said drum, the moulding member including means cooperating with the grooves of the drum for aligning the moulding member.

5. In a dough rolling and cutting machine, a revoluble drum, circumferential grooves in the surface of said drum, moulding means yieldably supported in spaced relation with the drum so as to present a feed opening to and a delivery opening from the space comprised between the moulding member and the drum and slicing blades fixed in the moulding member and extending entirely across said delivery opening, the extremities of said blades being received in said drum grooves to ensure complete severing of the dough after rolling.

6. In a dough rolling and cutting machine, a revoluble drum and moulding means supported in spaced relation therewith to comprise a moulding space with feed and delivery openings the latter opening being of rectangular cross section and the moulding means presenting a transverse convexity towards the drum adjacent the feed opening whereby the cross sectional area of the moulding space is locally constricted relatively to the area of the delivery opening.

7. A dough rolling and cutting machine as claimed in claim 6, wherein the transverse convexity of the moulding means extends in a substantially circular arc over the whole width of the moulding means.

8. A dough rolling and cutting machine as claimed in claim 6, wherein the area of the feeding opening is greater than that of the delivery opening.

9. A dough rolling and cutting machine as claimed in claim 6, including slicing means mounted in the moulding space adjacent the delivery opening, the cross sectional area of that part of the moulding space occupied by the slicing means being substantially constant along its length in the direction of feed.

SAMUEL VICTOR POULTNEY.